United States Patent
Pettus et al.

(10) Patent No.: US 9,740,382 B2
(45) Date of Patent: Aug. 22, 2017

(54) METHODS AND APPARATUS TO MONITOR TASKS IN A PROCESS SYSTEM ENTERPRISE

(71) Applicant: Fisher-Rosemount Systems, Inc., Round Rock, TX (US)

(72) Inventors: Nathan William Pettus, Georgetown, TX (US); Navin Rajashekar, Dubai (AE); Glenn Mclaughlin, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 726 days.

(21) Appl. No.: 13/748,090

(22) Filed: Jan. 23, 2013

(65) Prior Publication Data
US 2014/0208253 A1    Jul. 24, 2014

(51) Int. Cl.
| G06T 11/20 | (2006.01) |
| G06F 3/0484 | (2013.01) |
| G06F 21/57 | (2013.01) |
| G06F 11/30 | (2006.01) |

(52) U.S. Cl.
CPC ........ *G06F 3/04847* (2013.01); *G06T 11/206* (2013.01); *G06F 11/3055* (2013.01); *G06F 21/577* (2013.01)

(58) Field of Classification Search
CPC ............. G06F 11/3409; G06F 11/3048; G06F 11/3055; G06F 21/577; G06Q 10/06; H04L 41/08; Y02B 90/245; B01J 19/00; B01F 3/068; C08G 64/42; G06T 11/206

USPC .......................................................... 715/772
See application file for complete search history.

(56) References Cited

U.S. PATENT DOCUMENTS

| 7,258,175 B2 * | 8/2007 | Veeningen et al. ............. 175/40 |
| 2003/0187766 A1 * | 10/2003 | Akashi ........................... 705/35 |
| 2004/0054563 A1 * | 3/2004 | Douglas ........................... 705/7 |
| 2004/0186927 A1 | 9/2004 | Eryurek et al. |
| 2005/0149570 A1 * | 7/2005 | Sasaki et al. ............. 707/104.1 |
| 2005/0192855 A1 * | 9/2005 | Chitty et al. ....................... 705/7 |
| 2005/0209912 A1 * | 9/2005 | Veeningen et al. ............. 705/11 |
| 2005/0256735 A1 | 11/2005 | Bayne |
| 2006/0259277 A1 * | 11/2006 | Fantana et al. ............... 702/183 |
| 2008/0046104 A1 * | 2/2008 | Van Camp ............. G05B 15/02 700/90 |
| 2008/0052097 A1 * | 2/2008 | Bouzas et al. .................... 705/1 |
| 2008/0283153 A1 * | 11/2008 | Zurecki et al. ............... 148/217 |
| 2009/0125973 A1 * | 5/2009 | Byers et al. ....................... 726/1 |
| 2009/0138306 A1 * | 5/2009 | Coburn et al. ..................... 705/7 |
| 2009/0276391 A1 | 11/2009 | Kofman et al. |
| 2010/0275263 A1 * | 10/2010 | Bennett et al. ................. 726/25 |
| 2010/0312522 A1 | 12/2010 | Laberge et al. |
| 2011/0184586 A1 * | 7/2011 | Asano .................... G05B 15/02 700/297 |

(Continued)

*Primary Examiner* — Rinna Yi
(74) *Attorney, Agent, or Firm* — Hanley, Flight & Zimmerman, LLC

(57) ABSTRACT

Methods and apparatus to monitor tasks in a process system enterprise are disclosed. In one example, a method is disclosed that comprises analyzing, using a processor, tasks in an enterprise to determine a criticality of each task and an actionability of each task, ordering, using the processor, the tasks based on the criticality and the actionability of each of the tasks, and rendering, via a display, a first graphic representative of at least a portion of the ordered tasks.

24 Claims, 10 Drawing Sheets

(56) References Cited

U.S. PATENT DOCUMENTS

2012/0069131 A1* 3/2012 Abelow .................. 348/14.01
2012/0290351 A1* 11/2012 Bear et al. ................ 705/7.14
2012/0317058 A1* 12/2012 Abhulimen .................... 706/2
2013/0032076 A1* 2/2013 Zeng et al. ................. 114/265
2013/0173325 A1* 7/2013 Coleman et al. .......... 705/7.22

* cited by examiner

METHODS AND APPARATUS TO MONITOR TASKS IN A PROCESS SYSTEM ENTERPRISE

FIELD OF THE DISCLOSURE

This disclosure relates generally to process systems and, more particularly, to methods and apparatus to monitor tasks in a process system enterprise.

BACKGROUND

Process operations, like those used in the oil and gas production industry, typically include significant equipment assets, such as pumps, heat exchangers, cooling towers, etc., as well as numerous sensors, controllers, transmitters, etc., configured to control, manage, oversee, and/or implement the process operation. The ability to manage and maintain the condition, health, integrity, and/or performance of such equipment and associated processes serves to improve the safety and/or reliability of the corresponding process systems within an enterprise.

SUMMARY

Methods and apparatus to monitor tasks in a process system enterprise are disclosed. In one example, a method is disclosed that comprises analyzing, using a processor, tasks in an enterprise to determine a criticality of each task and an actionability of each task, ordering, using the processor, the tasks based on the criticality and the actionability of each of the tasks, and rendering, via a display, a first graphic representative of at least a portion of the ordered tasks.

In another example, a system is disclosed that comprises a processor to implement a system management application to analyze tasks in an enterprise, to quantify a criticality for each of the tasks, and to quantify an actionability for each of the tasks. The system further includes a display to render a first graphic representative of at least one of the criticality or actionability corresponding to at least a portion of the tasks in the enterprise

DETAILED DESCRIPTION

Control systems play an increasingly important role in the overall safety and reliability of the process plants which they control. With the rise of the open control system, in which some aspects of the control system are purchased off-the-shelf, it has become more challenging for plant personnel to fully comprehend what parts of the system need maintenance and/or administrative action to keep the system healthy and running reliably and safely. The challenge may be exacerbated when there are multiple systems at disparate sites within an overarching process system enterprise. As used herein, the term enterprise refers to a complete operational system that may or may not contain multiple systems at multiple sites that may be geographically separated or geographically isolated. Thus, as used herein, the term "enterprise" may refer to a single process plant, a single process system, and/or a worldwide network of numerous operational plants and facilities of varying sizes and functions.

To manage an enterprise, many known systems provide various work breakdown structures and/or lists of tasks to be performed, such as in a folder drop down or bar chart approach. Furthermore, some known systems group action items into like tasks or families of issues that may give some indication of priority (e.g., critical, important, notification, etc.). However, such indications of priority are typically based on an isolated alarm scheme that does not consider factors relating to the probabilities of any risk(s) associated with the alarm or the cost and/or ability to address the risk(s) by completing the relevant tasks involved. Accordingly, plant personnel reviewing such lists or tables of tasks have no easy way to determine an overall priority of any outstanding task based on its significance and/or impact on the system as a whole. The teachings disclosed herein overcome these obstacles.

Figure 1:
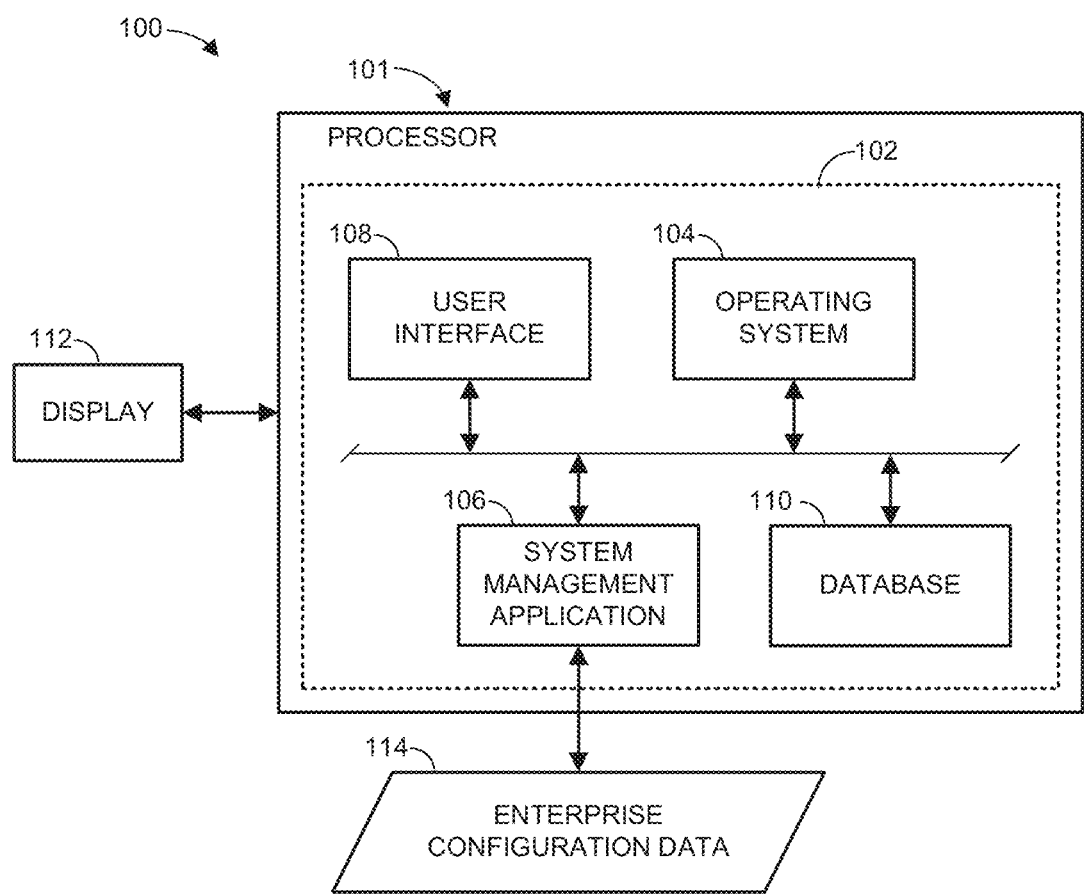
FIG. 1 is a schematic of an example apparatus constructed in accordance with the teachings disclosed herein.

FIG. 1 is a schematic of an example apparatus 100 to be used in accordance with the teachings disclosed herein. The example apparatus 100 of FIG. 1 includes at least one programmable processor 101. The example processor 101 of FIG. 1 executes coded instructions present in a main memory 102 of the processor 101 (e.g., within a random-access memory (RAM) and/or a read-only memory (ROM)). The processor 101 may be any type of processing unit, such as a processor core, a processor, a microcontroller, and/or any type of personal computer (PC). The processor 101 may execute, among other things, an example operating system 104, an example system management application 106, an example user interface 108, and/or an example database 110. An example operating system 104 is an operating system from Microsoft®. The example main memory 102 of FIG. 1 may be implemented by and/or within the processor 101 and/or may be one or more memories and/or memory devices operatively coupled to the processor 101.

To allow operators, engineers, administrators, and/or other personnel (hereinafter users) to interact with the example processor 101, the example apparatus 100 of FIG. 1 includes any type of display 112. Example displays 112 include, but are not limited to, a computer monitor, a computer screen, a television, a mobile device (e.g., a smart phone, a Blackberry™, an iPhone™, and/or an industrial portable PC), etc., capable of displaying user interfaces and/or applications implemented by the processor 101 and/or, more generally, the example apparatus 100. The example operating system 104 of FIG. 1 displays and/or facilitates the display of the example user interface 108 associated with the example system management application 106 by and/or at the example display 112. Aspects of the example user interface 108 are described below in greater detail in connection with FIGS. 2-6.

The example system management application 106 of FIG. 1 may be, for example, Guardian Support™ software for use with a DeltaV™ control system sold by Fisher-Rosemount Systems, Inc., an Emerson Process Management company. However, any other process control and/or system management application could be used instead. In any case, the example system management application 106 receives and/or analyzes enterprise configuration data 114. In some examples, the enterprise configuration data 114 corresponds to one or more sites, systems, units, and/or other components that are included within a particular enterprise. More particularly, the enterprise configuration data 114 may contain data regarding the configuration and/or status of the components within the enterprise to determine maintenance and/or administrative actions to be carried out. As used herein, a component of an enterprise may correspond to any of one or more sites, one or more systems, one or more units, one or more areas, one or more process cells, one or more workstations, one or more software packages, one or more pieces of hardware, one or more field devices, and/or any other suitable geographic, hierarchic, or functional division of the enterprise.

Once the enterprise configuration data 114 is received, the system management application 106 of FIG. 1 may analyze the data 114 to determine any outstanding tasks, action items, alerts, updates, notifications, and/or other issues that may need attention (collectively referred to herein as tasks) associated with the maintenance and/or administration of any component of the enterprise. For example, some tasks may be associated with software updates (e.g., hotfixes, security updates, etc.), the obsolescence of software and/or hardware, technical support calls (e.g., calls to a system support entity), the level of utilization of a software licensing package, the expiration of warranties and/or support for the system and/or equipment associated therewith, the renewal of registration for the system and/or providing updated configuration data 114 for analysis, other notifications and/or information articles associated with any relevant aspect of the system, and/or any other relevant task.

In the illustrated example, in addition to identifying tasks, the system management application 106 performs risk assessment on the tasks to determine an impact of each task on the reliability and/or safety of the enterprise component(s) associated with each task, which is herein referred to as the criticality of the task. In some examples, the criticality is quantified and normalized for relative comparison with other tasks identified within the enterprise. In this manner, the anticipated impact of a particular task may be assessed with respect to the particular enterprise component(s) associated with the task and/or calculated as an impact on the entire enterprise or any portion thereof.

The impact or criticality of a task may be determined and/or calculated based on a severity of risk associated with the failure to perform the task on the safety of personnel and/or to the reliability of the enterprise or portion thereof (e.g., defective products, reduced productivity, etc.). For example, a high impact task associated with the safety of an enterprise may be one that, if not performed, poses a risk of a loss of life or significant injury to one or more persons (e.g., a toxic chemical spill, an explosion, etc.). Similarly, a high impact task associated with the reliability of an enterprise may be one that, if not performed, poses a risk of an entire plant in the enterprise being shut down. In addition to the plant shutdown, the delay before the plant is back online and/or the significance of the plant relative to the entire enterprise may also affect an assessment of the impact of the task. Furthermore, the safety and reliability of an enterprise are not mutually exclusive during this analysis. For example, a toxic chemical spill or an explosion poses the risk of serious injury and/or the loss of life to personnel and may also require the shutdown of the plant. In addition to the above, other factors and/or types of risks with corresponding considerations on their severity may also be used to enable an impact of any task in an enterprise to be calculated.

Additionally, the impact of a task may be determined based on how significant a difference the task may have on the likelihood of the associated risk being realized when the task is implemented or otherwise carried out. For example, if the likelihood of an injury occurring (a relatively severe outcome) after an associated task has been performed is not significantly better than if the task were not performed, the overall impact of the task may be low relative to a task that would virtually eliminate the identified risk once implemented. Likewise, if the likelihood of a plant shutdown (a relatively severe outcome) is minimal even without performing an associated task to further reduce the chances of the shutdown, the task may again be relatively low as compared to a task that would drastically reduce the chances of a plant shutdown.

The above factors are given by way of example only and any other suitable factor(s) may be considered in determining the impact of a task based on a severity of a contemplated risk and/or the possibility of the risk being realized. In many examples, such factors may depend upon the particular processes, equipment, and/or products involved. In some examples, to particularly quantify the impact of various tasks in an enterprise in this manner depends upon probabilities. Accordingly, in such examples, the calculated impact of a task is based on a statistical analysis of historical records of the operation and reported failures of process plants or sites, particular process systems, and/or specific assets within an enterprise. Additionally or alternatively, calculations may also depend upon historical records of reported injuries and/or other accidents associated with the safety and/or reliability of the enterprise or any portion thereof. In some examples, such information may be based on industry supplied best practices. In other examples, this information may be provided by personnel knowledgeable about the particular enterprise being monitored. Furthermore, the information may be gathered from vendors of various equipment, assets, software packages, or other process system products or services. In this manner, specific root causes identified by vendors may be incorporated into the analysis of tasks in an enterprise. Using these metrics, a criticality for each task may be determined and quantified for comparison with other tasks. Using such information, the system management application 106 may organize and/or prioritize the tasks in the enterprise to enable a user to focus on those tasks having the largest impact.

In addition to determining the overall criticality of each task in an enterprise, the system management application 106 of FIG. 1 may also determine how readily the task may be performed, herein referred to as the actionability of the task. In some examples, the actionability of a task may be based on the viability and/or feasibility of the task. For example, a task that requires a significant amount of time, a significant number of personnel, significant costs, and so forth, may have a relatively low actionability. Any other factors indicative of how actionable a task is may also be considered in such an analysis. As with the criticality of the task, the actionability may be quantified and normalized for relative comparison across an entire enterprise or any portion thereof. In this manner, the system management application 106 may organize and/or prioritize the tasks in the enterprise to enable a user to focus on those tasks that can be completed quickly and/or easily, and/or make preparations for tasks involving a more complex response. In other words, as the criticality of a task provides a metric indicating the significance or impact of the task on the safety and/or reliability of the enterprise, the actionability of a task provides a metric indicating the impact or effect a user can have on each task and, therefore, how much a user can impact the enterprise. As described more fully below, combining these two metrics enables a user to more readily assess outstanding tasks to determine where the attention of the user should be focused to most impact the enterprise.

In some examples, instead of the system management application 106 analyzing the enterprise configuration data 114 and corresponding tasks within the enterprise, the enterprise configuration data 114 may be sent to, or accessed by, an independent entity providing system management support services (such as SureService™ support provided by Emerson Process Management). In such examples, the independent entity may perform the analysis outlined above and then provide the results to the system management application 106. In such examples, the system management application 106 receives the results and provides them to be displayed via the user interface 108 as described in greater detail below.

In the illustrated example, the database 110 of FIG. 1 stores the enterprise configuration data 114 and/or the results of analyzing the data 114 including the criticality and actionability determined for the tasks within an enterprise.

While the example apparatus 100 illustrated in FIG. 1 may be used to implement the teachings disclosed herein, the data structures, elements, processes and devices illustrated in FIG. 1 may be combined, divided, re-arranged, omitted, eliminated and/or implemented in any other way. Further, the example operating system 104, the example system management application 106, the example user interface 108, and the example database 110, and/or, more generally, the example apparatus 100 of FIG. 1 may be implemented by hardware, software, firmware and/or any combination of hardware, software and/or firmware. Thus, for example, any of the example operating system 104, the example system management application 106, the example user interface 108, and the example database 110, and/or, more generally, the example apparatus 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example operating system 104, the example system management application 106, the example user interface 108, and/or the example database 110 are hereby expressly defined to include a tangible computer readable medium such as a memory, DVD, CD, BluRay, etc. storing the software and/or firmware. Further still, the example apparatus 100 may include additional elements, processes and/or devices instead of, or in addition to, those illustrated in FIG. 1, and/or may include more than one of any or all of the illustrated data structures, elements, processes and/or devices.

Figure 2:
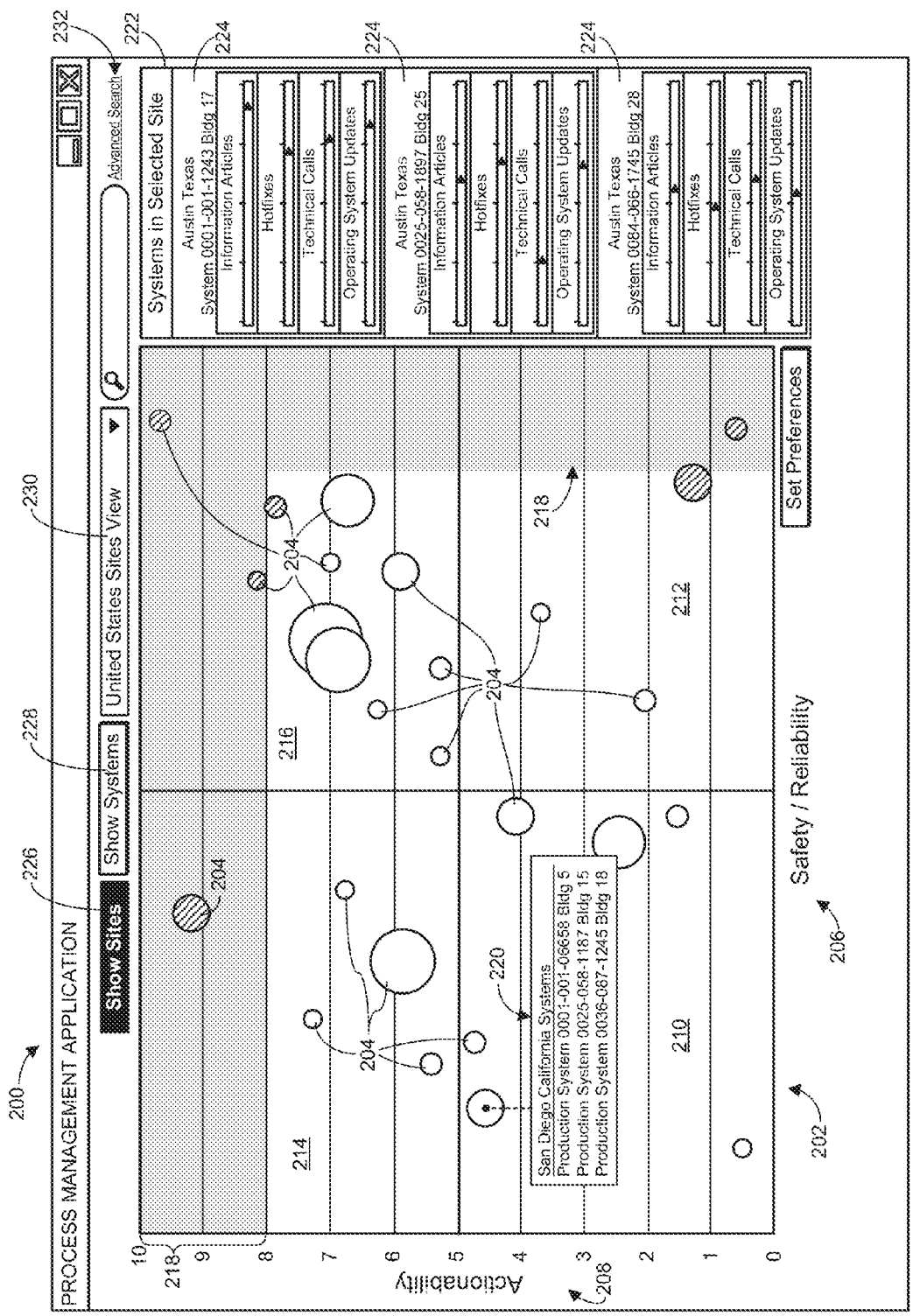
FIG. 2 illustrates an example overview page associated with the user interface of the system management application of FIG. 1 with a graphical representation of tasks associated with individual sites in an example enterprise.

FIG. 2 illustrates an example overview page 200 associated with the user interface 108 of the system management application 106 of FIG. 1 representing outstanding tasks corresponding to sites in an example enterprise. More specifically, the example overview page 200 may include a chart or graphic 202 having bubbles or markers 204. In the illustrated example, each marker 204 corresponds to a particular site in the enterprise. In some examples, the size of each marker 204 is representative of the number of outstanding tasks associated with the corresponding site. For example, a site having seventeen outstanding tasks is represented with a larger marker 204 than a site having only four outstanding tasks. In other examples, the size of each marker 204 is representative of the size of the corresponding site. For example, a site that includes nine systems would be represented by a larger marker 204 than a site with only two systems. Additionally or alternatively, rather than varying the size of the markers 204, in some examples, the appearance of the markers may be otherwise varied to distinguish the number of tasks and/or the size of each corresponding site. For example, the color, intensity, shape, outline, etc., could vary depending on the corresponding characteristic of each site being represented.

Regardless of the appearance of the markers 204 to represent each corresponding site, each marker 204 is plotted or located within the chart 202 according to the criticality and actionability of the task(s) associated with the site. As any particular site may have multiple outstanding tasks, the location of each marker 204 in the chart 202 may be based on a composite or average of the criticality and actionability of each task associated with the corresponding site as described more fully below. As shown in the illustrated example, the criticality (e.g., impact on safety and reliability) of the tasks associated with each marker 204 are plotted along the X-axis 206 of the chart 202 while the actionability of each marker 204 is plotted along the Y-axis 208 of the chart 202. In some examples, the axes 206, 208 may include a scale (as illustrated with the Y-axis 208). However, while the criticality and actionability may be quantified for each task, as described above, the quantified values are relative to other tasks. Accordingly, any suitable scaling of the chart 202 may be implemented that accords with how the tasks were assessed and prioritized based on their criticality and actionability. As each site may have multiple outstanding tasks, each with a different criticality and/or actionability, in some examples, the location of the marker 204 within the chart 202 is based on an average criticality and/or an average actionability. In some examples, the average may be a weighted average based on different weights assigned to different tasks, and/or types of tasks. In other examples, the location of each marker 204 corresponds to the most significant task associated with the site (e.g., the task having the highest criticality and/or the highest actionability). Displaying the tasks in this manner, may assist a user in determining the state of an enterprise and how to prioritize a response to the outstanding tasks by quickly identifying those tasks that may have the most significant impact on the entire enterprise and correspondingly, which of those tasks the user may be able to act upon most readily.

As shown in FIG. 2, the example chart 202 may be divided into four quadrants 210, 212, 214, 216. The first quadrant 210 corresponds to markers 204 having tasks with a relatively low criticality and a relatively low actionability. The second quadrant 212 corresponds to markers 204 having tasks with a relatively high criticality and a relatively low actionability. The third quadrant 214 corresponds to markers 204 having tasks with relatively low criticality and a relatively high actionability. The fourth quadrant 216 corresponds to markers 204 having tasks with a relatively high criticality and a relatively high actionability. Thus, the markers 204 plotted within the fourth quadrant 216 may contain tasks that a user may address to most affect the enterprise (i.e., having the best cost-benefit ratio) because the tasks may significantly impact the safety and/or reliability of the enterprise (having a high criticality) and the tasks can be implemented with relatively little cost, time, and/or effort (having a high actionability).

The next most significant quadrants correspond to the second and third quadrants 212, 214. The second quadrant 212 contains significant tasks because these tasks also have been evaluated as highly critical. However, the significance of a user's response to the tasks may be partially offset by a greater time, effort, and/or expense to accomplish the task because the task has been scored with a relatively low actionability. By contrast, the third quadrant 214 contains significant tasks because they can be easily taken care of as having relatively high actionabilities. However, the tasks in the third quadrant 216 are not as critical and, therefore, completing the tasks has less significance than the tasks in the fourth quadrant 216. Finally, the tasks in the first quadrant 210 may be the least significant because they have a relatively low criticality and there may be little that can be done very easily to address them as represented by the relatively low actionability of the tasks.

In some examples, each of the first, second, third, and fourth quadrants 210, 212, 214, 216 is shaded, highlighted, or otherwise distinguished in appearance to visually represent the relative significance of the tasks corresponding to the markers 204 plotted therein. In other examples, the chart 202 may be divided into smaller divisions and/or regions to provide greater granularity in prioritizing the tasks to be performed. For example, as shown in FIG. 2, a highlighted band 218 may be included at the outer extremes of the criticality and actionability on the chart 202 to contrast the areas where the most significant tasks exist relative to the rest of the markers 204 plotted in the chart 202. Furthermore, the highlighted band 218 may be subdivided into smaller sections having different colors, shading, and/or intensity corresponding to the different quadrants 210, 212, 214, 216 and/or into highlighted sub-bands. In some examples, the highlighted band 218 may be a different color than the rest of the chart 202 (e.g., red) and/or otherwise distinguished in appearance. Additionally or alternatively, as shown in FIG. 2, the markers 204 that fall within the highlighted band 218 may also change in appearance (e.g., color, shading, intensity, outline, etc.) to assist a user in identifying the sites containing the most significant tasks to be addressed.

In some examples, to assist a user in actually identifying the site associated with each marker 204, when a user hovers over a particular marker 204 (e.g., using a mouse) a pop-up 220 appears to identify the site location and/or the systems included within the site. Additionally or alternatively, a user may select a marker 204 corresponding to a particular site of interest (e.g., by clicking on the marker 204 via a mouse) to open a side bar 222 containing additional and/or more detailed information regarding the selected site. In some examples, the selected marker 204 will be highlighted or otherwise changed in appearance to indicate which marker 204 corresponds to the site selected. In the illustrated example, the side bar 222 includes panels 224 associated with each of the system(s) associated with the selected site. In addition to the panels 224 identifying each system in the selected site, the panels 224 may also indicate the number of outstanding tasks associated with one or more groupings or categories of tasks based on the types of tasks involves and/or some other commonality. For example, task categories may correspond to tasks associated with information articles, hotfixes, operating system updates, technical support calls, lifecycle status, changes in lifecycle status, license utilizations, customer support expirations, warranty expirations, or registration status among others.

The information articles task category may include tasks associated with notifications, summaries, and/or articles that provide relevant information to help a user identify and/or address any unexpected behavior in the enterprise that is not otherwise addressed by a task associated with another one of the task categories. The hotfixes task category may include tasks involving software updates and/or patches. In some examples, hotfixes may be identified by information articles. However, in other examples, hotfixes are branched off as their own category because of the sometimes critical nature of hotfixes. The operating system updates task category corresponds to software updates relating to the operating systems used at individual workstations of users. In some examples, operating system updates may be included with other hotfixes. However, in some examples, tasks associated with the operating system updates are separated into their own category because not all updates may be compatible with the system management software being used to run the enterprise. Accordingly, specific notifications may be associated with certain operating system updates as described in more detail below.

The technical support calls task category corresponds to calls to a system support entity. Calling a support entity is not a task in itself but if the issues associated with a call have not been resolved, the outstanding nature of the call and/or any associated outstanding action items may be defined as a task in accordance with the teachings of this disclosure. The lifecycle status task category includes tasks associated with how recent or outdated hardware and/or software in a system are and what sorts of support and/or replacement options are available for them. The changes in lifecycle status task category is related to the lifecycle status category and may provide notifications of when particular hardware or software changes status and/or an action item to replace the hardware or software.

The license utilization task category corresponds to tasks associated with the usage of a software licensing package and whether an expanded license needs to be sought. The customer support expiration task category is associated with tasks pertaining to the renewal and or update of a contract with a system support entity. The warranties expiration task category includes tasks associated with warranties on any of the software or hardware used within the enterprise. The registration status task category includes tasks associated with the registration and/or update status of the configuration of the enterprise for purposes of identifying tasks in any of the other categories. For example, in some situations, a support entity cannot directly access a particular system for security or other reasons. In such situations, a user associated with the system may need to log all the current configurations in the enterprise and provide such data (e.g., the enterprise configuration data 114 of FIG. 1) to the support entity for analysis.

In some examples, the task categories represented in the panels 224 may incorporate all of the tasks associated with each corresponding system. In other examples, the panels 224 may include only key task categories that may be the most relevant to a user. As shown in the illustrated example of FIG. 2, the key task categories included in each panel 224 include information articles, hotfixes, technical support calls, and operating system updates. In some examples, the number of tasks associated with each category may be represented by a number. In other examples, as illustrated in FIG. 2, the number of tasks associated with each category is represented graphically. In some such examples, the graphics may include a scale to indicate the actual number of tasks in each category. In other such examples, the graphical representations may be normalized to enable a comparison between categories and/or between systems. Other categories of tasks and/or other information associated with each system may additionally or alternatively be included in the respective panels 224 and represented in any suitable manner.

As illustrated in FIG. 2, various tools are provided near the top of the overview page 200 to enable a user to adjust, sort, filter, and/or search for information associated with the tasks in the enterprise and represent it graphically via the chart 202. For example, the overview page 200 includes a site button 226 and a system button 228. Selecting the site button 226 generates the chart 202 with the markers 204 representative of each site within an enterprise (as shown and described in FIG. 2). However, selecting the system button 226 generates the chart with the markers 204 representative of each system within the enterprise (as shown and described in greater detail below in connection with FIG. 3). Additionally or alternatively, the example overview page 200 may include a geographic region menu 230 to filter the sites and/or systems by specific region. For example, in FIG. 2 the chart 202 represented all sites across the United States. However, other views may be limited to particular regions, states, cities, etc., and or expanded to continents and/or a worldwide view. Although not shown, other methods of filtering sites and/or systems in an enterprise may be similarly implemented. For example, the markers 204 may be defined to correspond to other levels in the enterprise hierarchy (e.g., unit, area, process cell, workstation, etc.), sites by specific owner, types of processes involved, and/or any other suitable division or component of the enterprise down to each marker 204 representative of a single task. Furthermore, the example overview page 200 of FIG. 2 includes a search bar 232 through which a user may search for a particular site, system, etc., and/or a certain type or characteristic of sites and/or systems within the enterprise.

Figure 3:
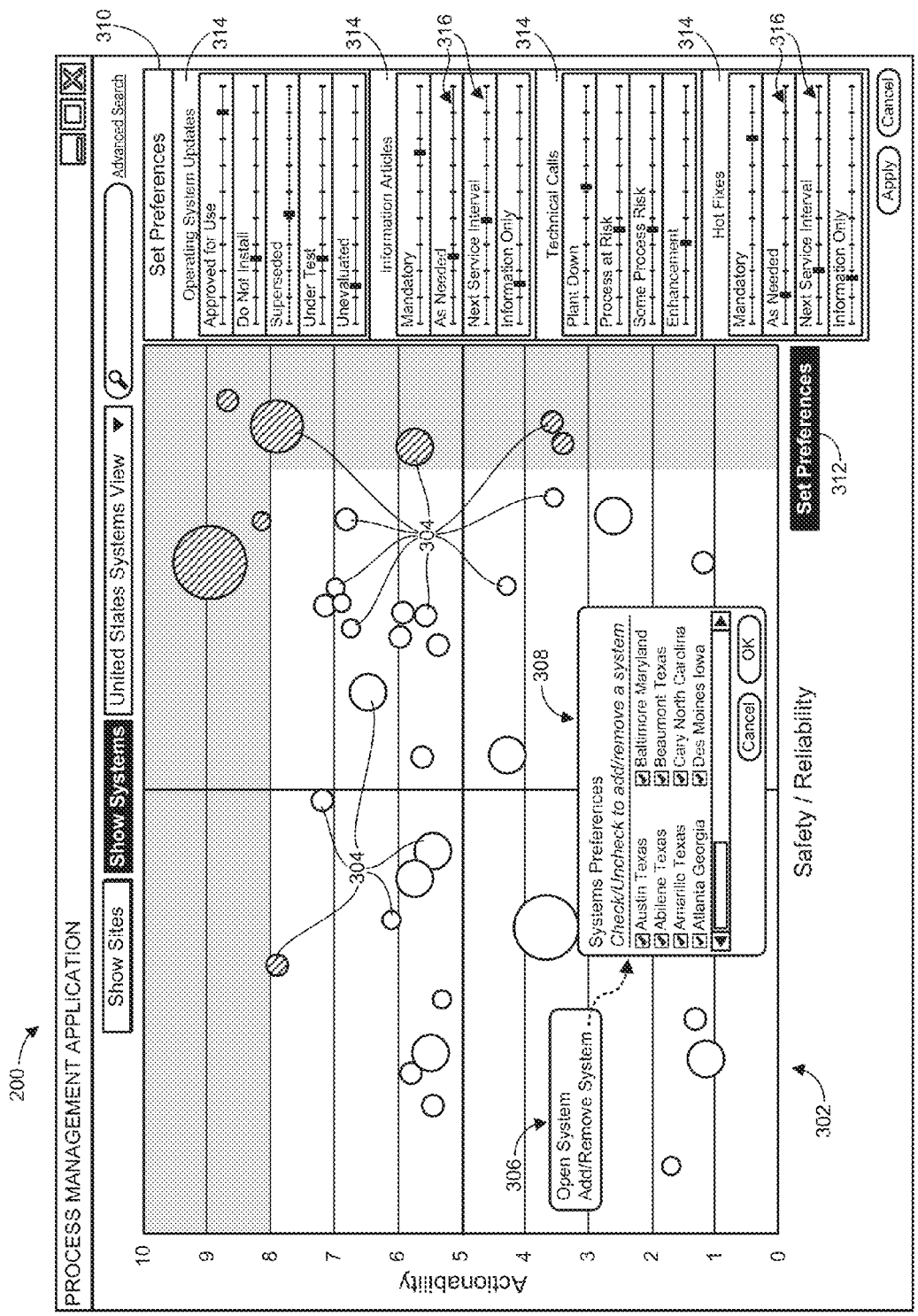
FIG. 3 illustrates the example overview page of FIG. 2 with a graphical representation of tasks associated with individual systems in an example enterprise.

FIG. 3 illustrates the example overview page 200 of FIG. 2 representing tasks corresponding to systems in an example enterprise. Accordingly, the overview page 200 of FIG. 3 includes a chart 302 populated by markers 304. The chart 302 of FIG. 3 and the chart 202 of FIG. 2 are the same except that the markers 304 in FIG. 3 are representative of individual systems within an enterprise whereas the markers 204 of FIG. 2 are representative of individual sites. As multiple systems may be included within a particular site, the example chart 302 in FIG. 3 contains more markers 304 than the number of markers 204 in the chart 202 of FIG. 2. Additionally, as shown in the illustrated examples, the markers 304 are not necessarily plotted in the same location within the chart 302 as the markers 204 within the chart 202 because the location of the markers 304 are plotted according to the criticality and actionability of the tasks associated with each system whereas the markers 204 are plotted according to the criticality and actionability of the tasks associated with each site, which may include multiple systems. Thus, for example, if the locations of the markers 204, 304 are based on a weighted average of all tasks associated with markers 204, 304, the resulting averages will be different.

In some examples, a user may add or remove specific systems from inclusion in the chart 302 (or chart 202 of FIG. 2). For example, a user may right-click on the chart 302 to open an options window 306. In the illustrated example, the options window 306 includes the ability to open a system, add a system, and/or remove a system. By selecting the "add/remove" option, a system preferences window 308 may appear to enable a user to select or deselect (e.g., via check boxes) any system within the enterprise to be added or removed from the chart 302. When a user selects the open option, a similar window may appear to enable a user to select a particular system to open up a corresponding system view page providing detailed information about the selected system. An example system view page is described in further detail below in connection with FIGS. 5-6. In this same manner, if a user is viewing the enterprise at the site level (by, for example, the chart 202 of FIG. 2), the user may similarly be able to add or remove sites to the display and/or select a particular site to open up a corresponding site view page as described in further detail below in connection with FIG. 4.

Additionally, when viewing any of the site view (FIG. 2), the system view (FIG. 3), or any other view of the enterprise or portion thereof, a user may be able to set preferences to adjust the weighting of the criticality or actionability of various tasks via a preference side bar 310 to focus on task of particular interest to the user. As illustrated in FIG. 3, the preference side bar 310 may be accessed by clicking on a "Set Preferences" button 312. The preference side bar 310 includes panels 314 each associated with a specific task category. In some examples, the task categories provided in the preference side bar 310 may be the same as the task categories included in each of the panels 224 of FIG. 2. In other examples, the task categories may be different than the categories represented in the preference side bar 310. Additionally, each task category associated with each panel 314 may be separated further into multiple subcategories. The subcategories of tasks may be organized according to a priority of each task based on the significance and/or type of the task relative to other tasks within the broader task category. For example, as described above, not all operating system updates may be compatible with other software used in the system. Accordingly, different subcategories for tasks associated with operating system updates may include updates that are approved for use, updates that should not be installed, updates that have been superseded, updates that are under test, and/or updates that are unevaluated. In such examples, the tasks associated with approved updates and updates that should not be installed may have the highest priority as the most important to be followed. Likewise, subcategories for tasks associated with information articles may include notifications, summaries, and/or articles describing mandatory actions, actions to be implemented only as needed, actions that can be postponed until the next service interval, and/or other useful information that may not be associated with any particular action. Similarly, the other top level task categories may be divided into other suitable subcategories based on the nature of the tasks involved for each.

In connection with each of the subcategories of tasks within each general task category corresponding to each of the panels 314, a user adjustable mechanism may be provided to enable a user to define a weight to be applied to the subcategory of tasks. For example, as shown in FIG. 3, the adjustable mechanism may include a slider bar 316 that varies the weight of the tasks in the subcategory as the slider on the slider bar 316 is moved. In some examples, the weight of each task subcategory may be determined based on the position of the slider relative the position of the other sliders associated with tasks in the other subcategories. In the illustrated example, changing the weight of the tasks in this manner affects the position of the markers 204 because it affects the weighted average of the criticality and/or actionability of all the tasks associated with each site or system being represented by the corresponding marker 204, 304. For example, if a user is only interested in mandatory hotfixes, the user may move the slider for each of the other subcategories (as needed, next service interval, and information only) all the way to the left of the corresponding slider bar 316 to set their weights to zero. In doing so, the markers 304 in chart 302 that contained a hotfix that is not mandatory would be repositioned on the chart 302 as if these tasks were not present. In other examples, a user may have all subcategories of hotfixes accounted for in the chart 302 but give more weight to mandatory hotfixes by adjusting the appropriate slider bars 316 as shown in FIG. 3. While the illustrated example of FIG. 3 shows the weighting capable of adjustments by a user at the subcategory level, in other examples a user may be able to change the weighting of an entire task category (e.g., a user may zero out all information articles if the user deems them all unimportant or otherwise not relevant to the interests of the user). Additionally or alternatively, in some examples a user may be able to adjust the weighting of a smaller subset of tasks, such as, the tasks associated with a particular system and/or individual tasks. Furthermore, the slider bar 316 is provided by way of example only. Any appropriate user adjustable mechanism may be implemented for a user to vary the weighting of the tasks (e.g., by entering numeric values, clicking check boxes, etc.)

Figure 4:
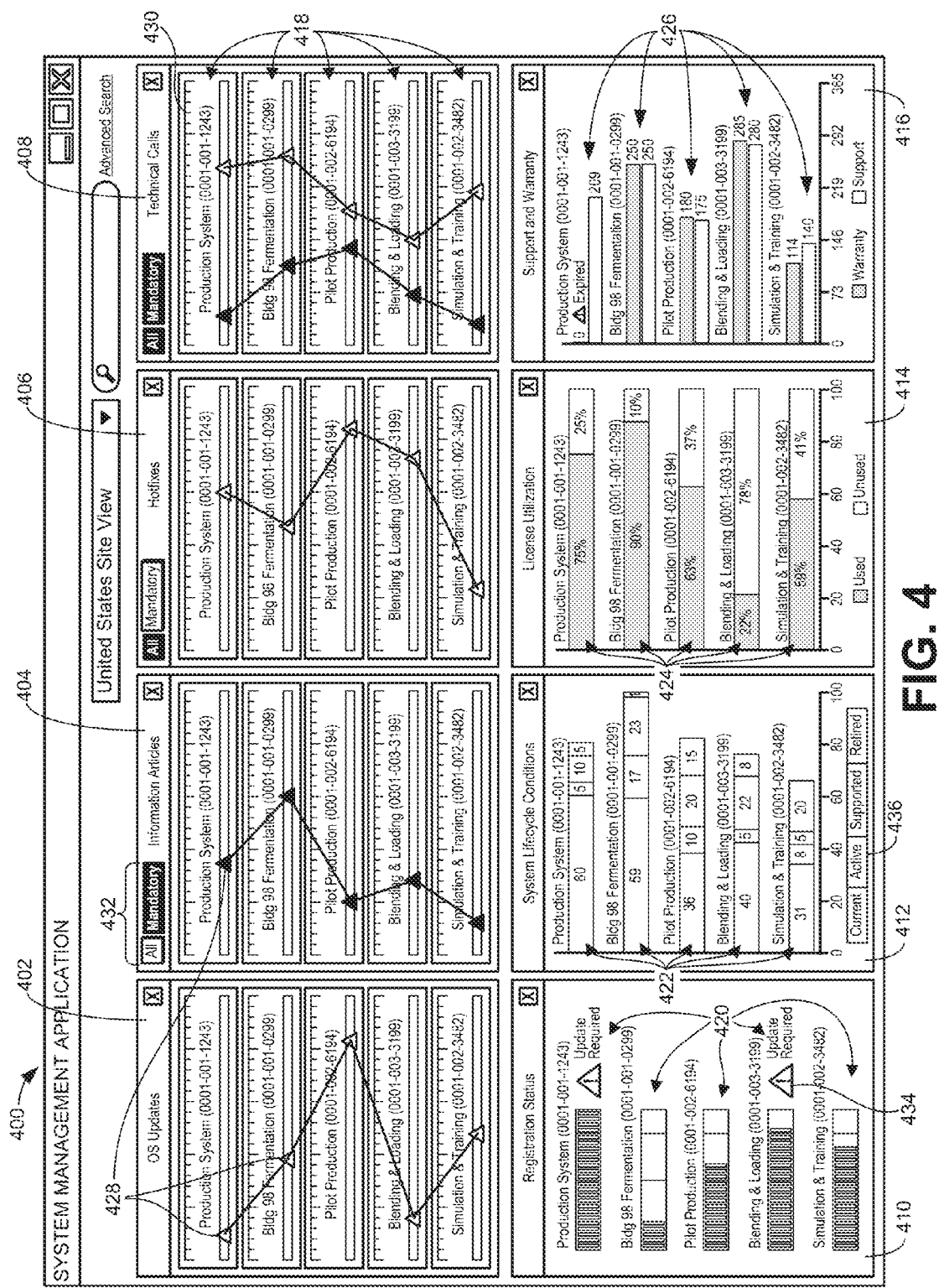
FIG. 4 illustrates an example site view page associated with the user interface of the system management application of FIG. 1 corresponding to a particular site in an example enterprise.

FIG. 4 illustrates an example site view page 400 associated with the user interface 108 of the system management application 106 of FIG. 1. In the illustrated example, the site view page 400 includes multiple panels 402, 404, 406, 408, 410, 412, 414, 416 corresponding to different categories of tasks. In the illustrated example, the panels 402, 404, 406, 408, 410, 412, 414, 416 include an operating system update panel 402, an information articles panel 404, a hotfixes panel 406, a technical support calls panel 408, a registration status panel 410, a hardware lifecycle panel 412, a license utilization panel 414, and a support and warranty panel 416. Each panel 402, 404, 406, 408, 410, 412, 414, 416 may include one or more graphics 418, 420, 422, 424, 426 representative of the number, status, condition, and/or other characteristics of the tasks within a particular system corresponding to the task categories of the respective panels 402, 404, 406, 408, 410, 412, 414, 416. For example, as shown in FIG. 4, each panel 402, 404, 406, 408, 410, 412, 414, 416 contains five graphics 418, 420, 422, 424, 426 corresponding to five systems. In some examples, the systems represented by the graphics 418, 420, 422, 424, 426 correspond to each of the systems within the site selected in opening in the site view page 400. In other examples, the graphics 418, 420, 422, 424, 426 may be representative of specific systems selected by a user from a single site (e.g., the site selected from the overview page 200 of FIG. 2) and/or from different sites (e.g., the five sites across the enterprise having the most significant tasks to be addressed). Furthermore, in the illustrated example, each of the five graphics 418 in each panel 402, 404, 406, 408, 410, 412, 414, 416 are arranged in the same order for easy comparison. In some examples, a user may sort the systems by a particular task category (e.g., hotfixes associated with panel 406) such that the system having the most tasks (or most significant tasks) in that category appears on top and so on down to the system having the least tasks (or least significant tasks) in the particular category being placed at the bottom. In such examples, the ordering of the graphics 418, 420, 422, 424, 426 in each of the other panels 402, 404, 406, 408, 410, 412, 414, 416 associated with the other categories of tasks may also be adjusted to correspond to the ordering of the graphics 418, 420, 422, 424, 426 associated with the task category of interest to the user. Although the foregoing discussion and corresponding figure describes the examples as displaying five graphics 418, 420, 422, 424, 426 in each panel 402, 404, 406, 408, 410, 412, 414, 416, any suitable number of graphics 418, 420, 422, 424, 426 may be rendered for each task category as may be desirable. Similarly, there may be more or fewer panels 402, 404, 406, 408, 410, 412, 414, 416 than shown in the illustrated example, which may be based on the same or different categories as described herein.

In the illustrated example of FIG. 4, each of the operating system update panel 402, the information articles panel 404, the hotfixes panel 406, and the technical support calls panel 408 contain similar graphics 418 that have indicators 428 positioned along a scale 430 to indicate the number of tasks within each system for the associated category of tasks (i.e., operating system updates, information articles, hotfixes, and technical support calls). In some examples, the scale 430 in the graphic may be labeled with numbers to indicate the actual number of tasks corresponding to each system under each task category. In other examples, the indicators 428 may be positioned along the scale 430 to indicate a number of tasks within each system relative to the number of tasks in every other system without specifically identifying the quantities involved. Additionally or alternatively, as shown in the illustrated example, the information articles panel 404, the hotfixes panel 406, and the technical support calls panel 408 contain buttons 432 that enable a user to set the corresponding graphics 418 to represent the total number of outstanding tasks in each system (e.g., by clicking the "All" button as illustrated in the information articles panel 104) or to represent only the number of tasks that are mandatory or most critical (e.g., by selecting the "Mandatory" button as illustrated in the hotfixes panel 406). In some such examples, the indicators 428 may change in appearance (e.g., color, shape, intensity, outline, etc.) to distinguish when the indicator 428 represents all outstanding tasks in the system of the associated category and when the indicators 428 represent only the mandatory tasks. Further, in some examples, both the "All" button and the "Mandatory" button may be selected to display two sets of indicators 428 along the scale 430 as shown in the technical support calls panel 408.

Each of the registration panel 410, the lifecycle panel 412, the license utilization panel 414, and the support and warranty panel 416 contains different graphics 420, 422, 424, 426 to represent the relevant condition, status, and/or characteristics of the tasks associated with each of the panels

410, 412, 414, 416. In some example, where the analysis of each system is performed by an independent entity providing system management support services, the graphics 420 in the registration panel 410 indicate the level of update information that has been acquired since the configuration of the corresponding system was last registered with the system management support entity. As the support entity may only receive configuration updates periodically, the support entity may have no way of determining whether certain tasks have been performed or whether the configuration of the system has been updated. Rather, all analysis may be based on the last update provided. As such, the longer the period between updates, the less relevant notifications and/or alerts associated with outstanding tasks may become. Accordingly, the graphics 420 provide a status bar that may fill up as time goes on and/or new information is determined to apply to the most recent update of the system configuration. In some examples, the status bar of the graphic 420 in the registration status panel 410 may be divided into multiple sections having a different color (e.g., green, yellow, red) to indicate how critical a new system configuration update is for effective analysis. Additionally or alternatively, if the most recent system configuration update is significantly out of date, an alarm icon 434 may be displayed to indicate an update of the system configuration is required for reliable analysis and feedback.

The graphics 422 of the lifecycle panel 412 are indicative of the lifecycle condition of hardware and/or software used within the corresponding system. As shown in FIG. 4, the graphics 422 comprise a stacked bar chart containing four separate sections. In the illustrated example, the four sections indicate the portion of hardware and/or software within the corresponding system that are in one of four phases of the lifecycle associated with the hardware and/or software. For example, from left to right the four sections may correspond to current hardware and/or software, active hardware and/or software, supported hardware and/or software, and retired hardware and/or software as indicated by the sectioned bar 436 at the bottom of the lifecycle panel 412. In such examples, current hardware and/or software correspond to hardware and/or software being actively sold and supported. Active hardware and/or software correspond to hardware and/or software that are still available and supported but no longer the primary focus of vendors (e.g., older models/versions of the hardware and/or software). Supported hardware and/or software correspond to hardware and/or software that are no longer available for purchase but are still supported to some extent. Retired hardware and/or software correspond to hardware and/or software that are no longer available for purchase and no longer supported. Thus, the relative size of each section in each stacked bar of each graphic 422 is representative of the portion of hardware and/or software within the corresponding system that is in the particular lifecycle category outlined above. In this manner, a user can quickly assess how soon each corresponding system may need to be updated with new software and/or hardware.

The graphics 424 of the license utilization panel 414 are indicative of the percentage of a license for software used by the system. Typically, process systems acquire a software license package according to the size of the system. If the system expands, the license may not be adequate to cover all nodes in the system and a larger license may be sought. Accordingly, the graphics 424 provide an indication of the percentage of a current license that is being utilized based on a current configuration of the system. In some examples, the license utilization panel 414 is associated with license of the primary or host process control software of the system. In other examples, the panel 414 may indicate the utilization of other licenses used by the system.

The graphics 426 of the support and warranty panel 416 indicate the time remaining (e.g., in days) before a warranty and/or support on current hardware and/or software assets in the system may expire. In some examples, the warranty and/or support correspond to the main software of the system. However, in other examples, the time left on warranties and/or support for other assets may additionally or alternatively be represented via the graphics 426.

While each of the panels 402, 404, 406, 408, 410, 412, 414, 416 contains graphics 418, 420, 422, 424, 426, other visual depictions and/or other methods of representing the data pertaining to each of the task categories associated with the panels 402, 404, 406, 408, 410, 412, 414, 416 may be implemented in addition to, or as an alternative to, what has been shown and described above. Additionally, different categories of tasks and/or different panels may be implemented in addition to, or instead of, the panels 402, 404, 406, 408, 410, 412, 414, 416 of FIG. 4 described herein. Furthermore, while the site view page 400 has been shown and described as corresponding to a particular site and the graphics 418, 420, 422, 424, 426 correspond to different systems, the site view page 400 and the graphics 418, 420, 422, 424, 426 may be suitably adapted to correspond to any other component within the enterprise.

Figure 5:
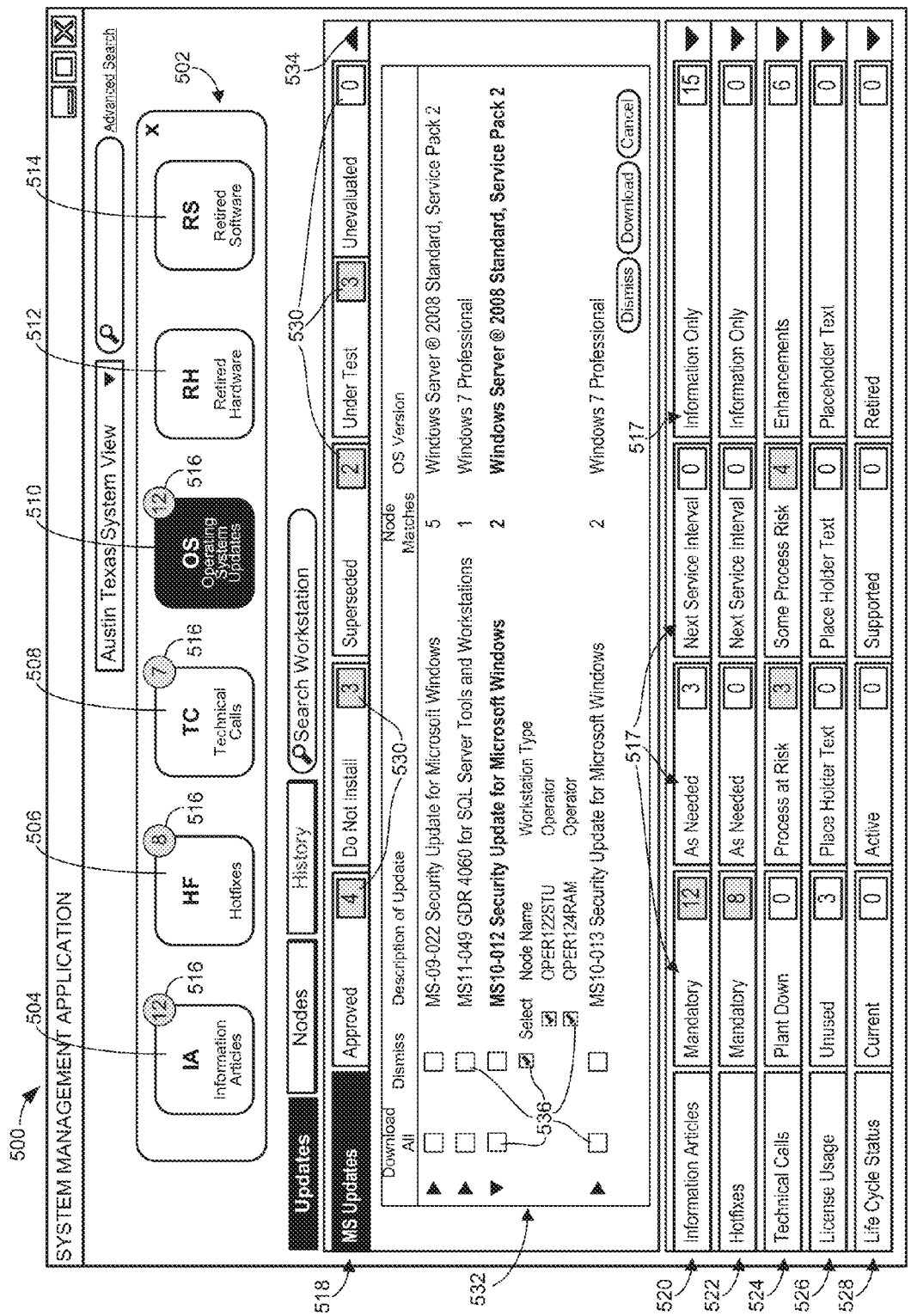
FIG. 5 illustrates an example system view page associated with the user interface of the system management application of FIG. 1 corresponding to a particular system in an example enterprise.

FIG. 5 illustrates an example system view page 500 associated with the user interface 108 of the system management application 106 of FIG. 1. In the illustrated example, the system view page 500 includes a category alert pane 502 that contains icons, buttons, or other visual graphics 504, 506, 508, 510, 512, 514 associated with key task categories. For example, as shown in FIG. 5, the icon 504 is associated with information articles, the icon 506 is associated with hotfixes, the icon 508 is associated with technical support calls, the icon 510 is associated with operating system updates, the icon 512 is associated with retired hardware, and the icon 514 is associated with retired software. In the illustrated example, each icon 504, 506, 508, 510, 512, 514 includes an alert indicator 516. In some examples, the alert indicators 516 indicate the number of outstanding tasks associated with the task category of the corresponding icon 504, 506, 508, 510, 512, 514. In other examples (as illustrated in FIG. 5), the alert indicators 516 indicate the number of critical and/or otherwise important tasks associated with the corresponding task category. In this manner, a user may quickly identify the number of tasks, the type of tasks, and/or the impact or severity of the tasks on the system being displayed in the system view page 500. While the alert indicators 516 are shown as part of the icons 504, 506, 508, 510, 512, 514, in other examples, the indication may be separately provided. Additionally or alternatively, the indication of the number of tasks may be displayed in any other suitable manner. Furthermore, where there are no critical tasks (or no tasks at all), the alert indicator 516 may be absent, as shown for the icons 512, 514.

In some examples, the system view page 500 includes category information bars 518, 520, 522, 524, 526, 528 corresponding to the icons 504, 506, 508, 510, 512, 514. In other examples, the category information bars 518, 520, 522, 524, 526, 528 may be associated with different task categories. For example, the category information bar 526 in FIG. 5 is associated with license usage that is unrelated to the categories associated with the icons 504, 506, 508, 510, 512, 514 identified above. Additionally, the category information bar 528 in FIG. 5 is associated with lifecycle status, which may include both retired hardware and retired software corresponding to the separate icons 512, 514 in the category alert pane 502.

In addition to separating all tasks in the system based on task category, in some examples, the tasks may be grouped into task subcategories as described above in connection with FIG. 3. In some such examples, as illustrated in FIG. 5, the category information bars 518, 520, 522, 524, 526, 528 may include different tabs 517 corresponding to the task subcategories associated with each of the broader task categories corresponding to each category information bar 518, 520, 522, 524, 526, 528. Further, each of the tabs 517 may include additional alert indicators 530 to indicate the total number of outstanding tasks associated with the corresponding task subcategory. In some examples, the number within the alert indicators 530 and/or the box surrounding the alert indicators 530 may have a different appearance (e.g., highlighted, shaded, colored, outlined, etc.) for critical and/or high priority tasks relative to the alert indicators 530 associated with tasks of less significance. In some examples, a similar appearance may be employed for the alert indicators 516 associated with the icons 504, 506, 508, 510, 512, 514 of the category alert pane 502.

Each of the category information bars 518, 520, 522, 524, 526, 528 may be expanded to display a list or table 532 that provides details regarding the specific tasks outstanding within the corresponding task category. For example, in FIG. 5, the information bar 518 has been expanded to display table 532, which lists specific updates to be downloaded. In some examples, the information bars 518, 520, 522, 524, 526, 528 are expanded via the arrow 534 at the end of each information bar. Additionally or alternatively, a user may access the table 532 associated with a particular information bar by selecting (e.g., via a mouse click) the corresponding icon 504, 506, 508, 510, 512, 514 and/or by selecting (e.g., via a double mouse click) the corresponding category information bar 518, 520, 522, 524, 526, 528. As shown in the illustrated example, the table 532 lists each update (i.e., each task corresponding to the operating system update task category) that is outstanding within the system along with other relevant information. In some examples, the table 532 may list all outstanding updates within the system. Additionally or alternatively, if a user selects one of the tabs 517 (e.g., via a mouse click), the table 532 may be populated only by the updates corresponding to the task subcategory associated with the selected tab 517.

In addition to listing the outstanding updates, the table 532 may also identify each particular node and/or workstation within the system where the update (or other task as appropriate) is outstanding. Beyond providing detailed information about outstanding tasks, the table 532 may also enable a user to select (e.g., via check boxes 536) particular updates for download or dismissal as applied to the entire system and/or with respect to a particular node and/or workstation within the system.

Figure 6:
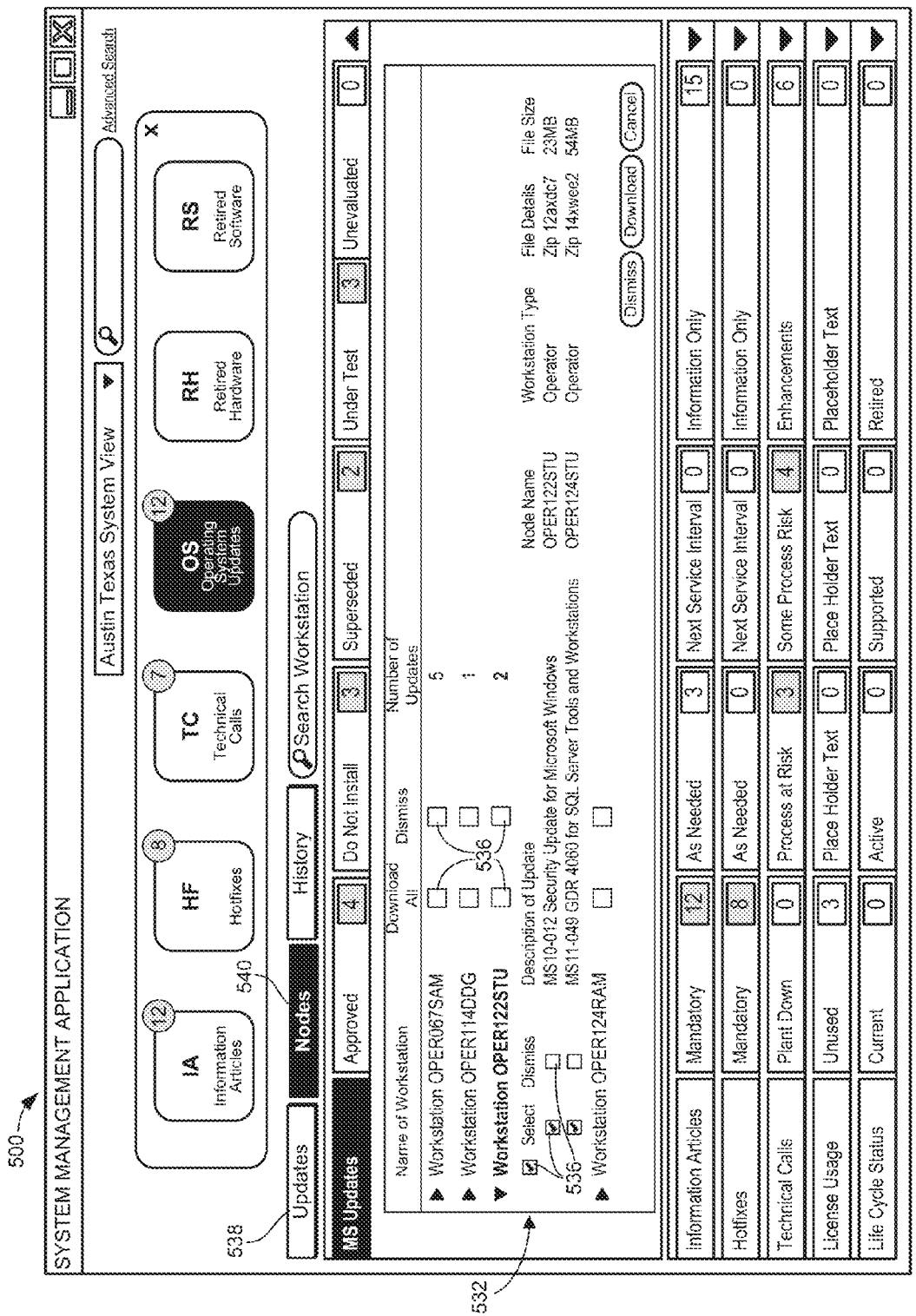
FIG. 6 illustrates a modified view of the example system view page of FIG. 5.

While the table 532 of FIG. 5 is organized based on the different types of updates to be installed, in some examples, the table 532 may be adjusted to list the updates based on the nodes needing the updates. For example, FIG. 6 illustrates the example system view page 500 of FIG. 5 with the table 532 organized according to the nodes or workstations within the system to which the outstanding updates apply. In this manner, a user may choose (e.g., via checkboxes 536) to download or dismiss all the updates associated with a particular node and/or select a particular update to be downloaded or dismissed for the particular node. In the illustrated example, a user may toggle between the update-based view of the table 532 in FIG. 5 and the node-based view of the table 532 in FIG. 6 by selecting the corresponding "updates" button 538 or "nodes" button 540. In some examples, toggling between the "updates" button 538 and the "nodes" button 540 also changes the alert indicators 516, 530 between indicating the number of outstanding updates and the number of nodes associated with one or more of the updates.

While the table 532 of FIGS. 5 and 6 has been shown and described in connection with the operating system updates task category, a similar table may be displayed under each of the other category information bars 520, 522, 524, 526, 528 that is suitably adapted to the tasks and related information associated with the corresponding task categories. Furthermore, the particular format, appearance, and content of the various aspects of the system page view 500 described in connection with FIGS. 5 and 6 are provided by way of example only, and any of the above description may be varied without going beyond the scope of the teachings disclosed herein. For example, while the system view page 500 of FIGS. 5 and 6 has been shown and described as corresponding to a particular system in an enterprise, the system view page 500 may be adapted to correspond to any other suitably component in the enterprise of greater or lesser magnitude than the example system described herein.

Figure 7:
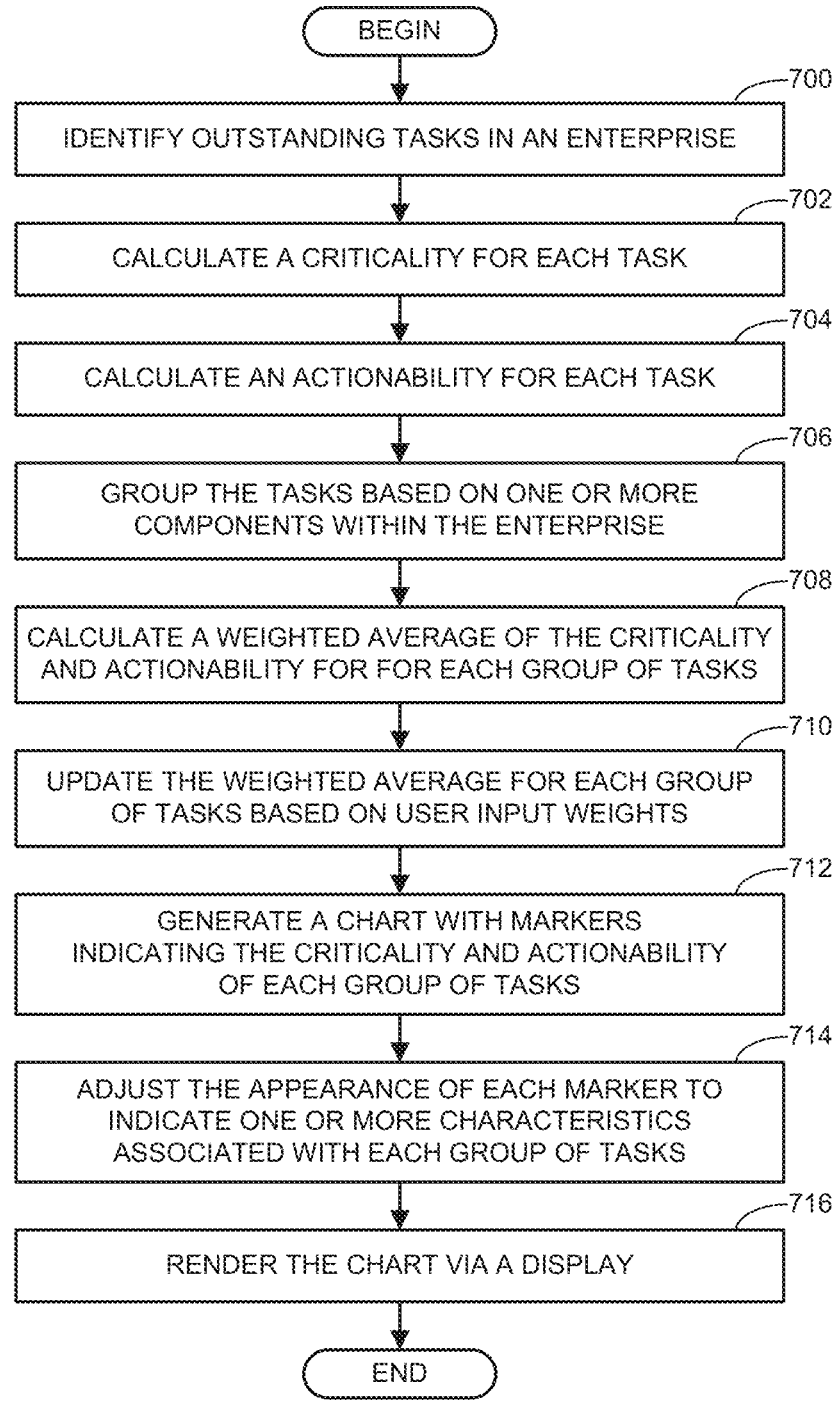
FIG. 7 is a flowchart representative of an example process that may be carried out to implement the apparatus of FIG. 1 to generate a graphical representation of the criticality and actionability of tasks in an enterprise.
Figure 8:
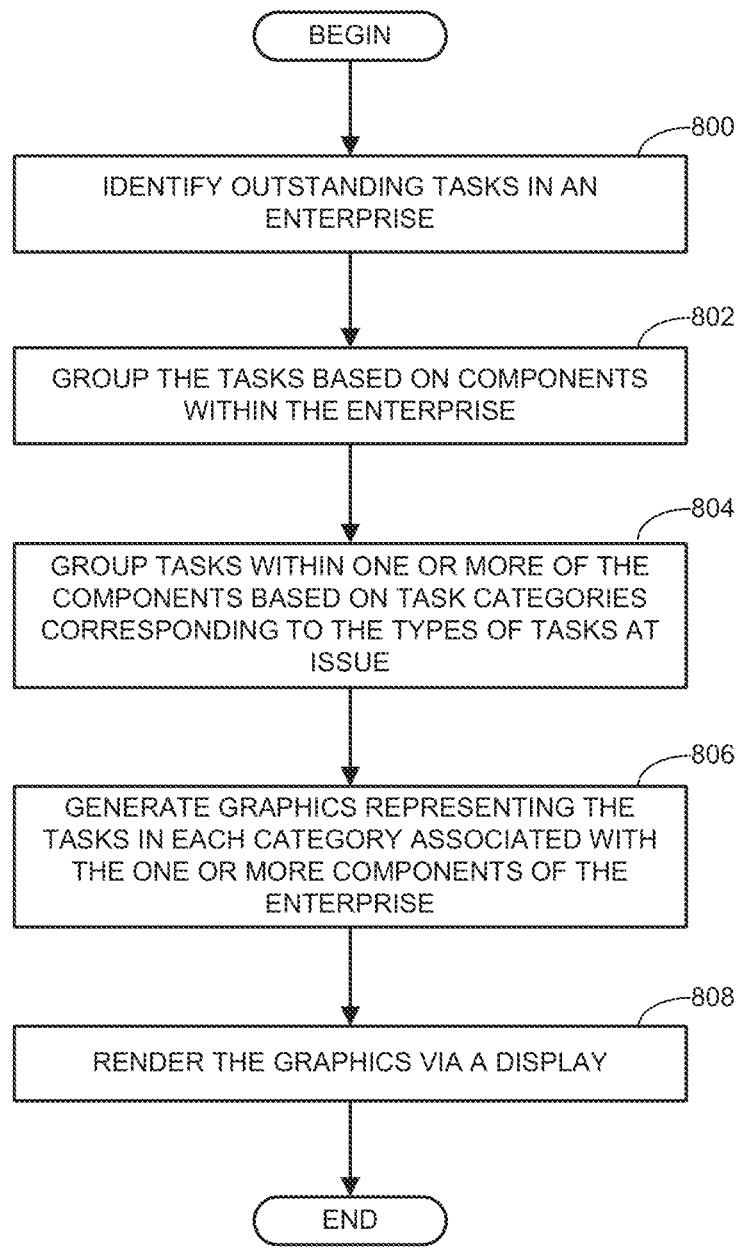
FIG. 8 is a flowchart representative of an example process that may be carried out to implement the apparatus of FIG. 1 to generate graphics representing tasks grouped by category in one or more components of an enterprise.
Figure 9:
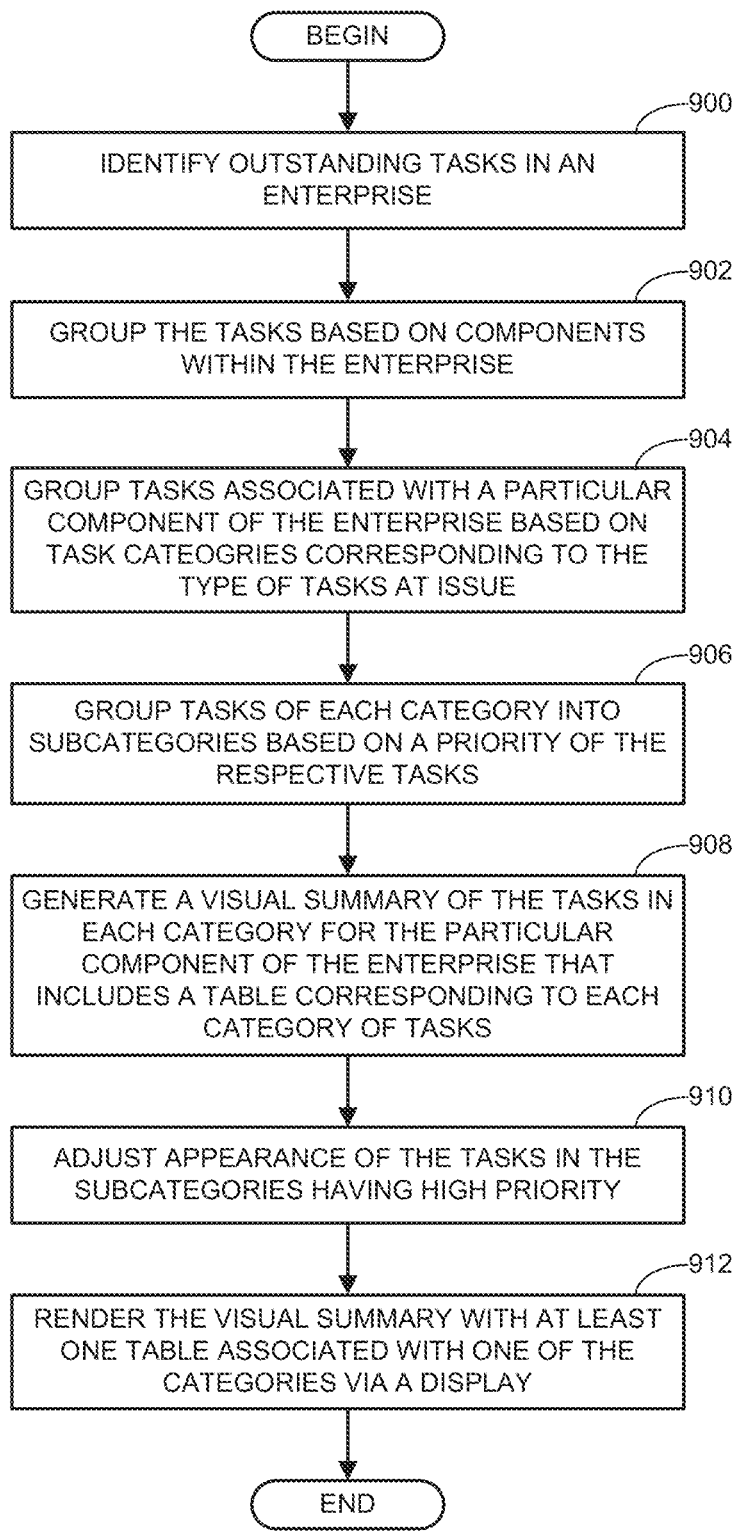
FIG. 9 is a flowchart representative of an example process that may be carried out to implement the apparatus of FIG. 1 to generate a table detailing information regarding the tasks associated with a component of an enterprise.

FIGS. 7-9 are flowcharts representative of example processes that may be carried out to implement the example system management application 106 of FIG. 1 and/or, more generally, the example apparatus 100 of FIG. 1. More particularly, the example processes of FIGS. 7-9 may be representative of machine readable instructions that comprise a program for execution by a processor such as the processor 1012 shown in the example processor platform 1000 discussed below in connection with FIG. 10. The program may be embodied in software stored on a tangible computer readable medium such as a CD-ROM, a floppy disk, a hard drive, a digital versatile disk (DVD), a BluRay disk, or a memory associated with the processor 1012. Alternatively, some or all of the example process in each of FIGS. 7-9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIGS. 7-9 may be implemented manually or as any combination(s) of any of the foregoing techniques, for example, any combination of firmware, software, discrete logic and/or hardware. Further, although the example processes are described with reference to the flowcharts illustrated in FIGS. 7-9, many other methods of implementing the example system management application 106 of FIG. 1 and/or, more generally, the example apparatus 100 of FIG. 1 may alternatively be used. For example, the order of execution of the blocks may be changed, and/or some of the blocks described may be changed, eliminated, or combined. Additionally, any or all of the example process in each of FIGS. 7 and 8 may be performed sequentially and/or in parallel by, for example, separate processing threads, processors, devices, discrete logic, circuits, etc.

As mentioned above, the example processes of FIGS. 7-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7 and 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 is a flowchart representative of an example process that may be carried out to implement the apparatus 100 of FIG. 1 to generate a graphical representation of the relative criticality and actionability of tasks in an enterprise. The example process of FIG. 7 includes identifying outstanding tasks in an enterprise (block 700). In some examples, the tasks identified may be all tasks within the enterprise. In other examples, the example process may only identify a portion of the tasks within an enterprise. How each outstanding task is identified may depend upon the type task. For example, operating system updates may be identified automatically over the internet as new updates are released. In other examples, tasks associated with information articles may be identified as the corresponding notifications, summaries, or articles are produced. In any case, the tasks may be identified based on the software and/or hardware configurations of the enterprise and/or the process systems within the enterprise. For example, if a certain equipment asset enters a retired status for its lifecycle, the example process would identify the change of status. Alternatively, if the equipment asset was replaced, different issues and/or tasks may be recognized.

The example process then calculates a criticality for each task (block 702). As described above in connection with FIG. 1, calculating the criticality or impact of a task may involve two main aspects: (1) determining the severity of the risk associated with the task on the safety and/or reliability of the enterprise or portion thereof, and (2) determining the effect of performing the task on the likelihood of the risk being realized. For example, the criticality of a severe risk may be partially mitigated if performing the task associated with the risk only marginally improves the chances of avoiding the risk. In contrast, the criticality of a task associated with a relatively minor risk may nevertheless be relatively high if the probability of the risk being realized is significantly higher if the task is not performed than after the task is performed. The example process further includes calculating an actionability for each task (block 704). Whereas the criticality of a task may be based on the risk involved and the effect of the task on the probability of the risk being realized, actionability may be based on the feasibility and/or practicability of actually performing the task, which may be based on the effort, time, expense, and so forth, associated with accomplishing the task.

Based on the calculations of the criticality (block 702) and the actionability (block 704) of each task, the tasks can be ranked or ordered for comparison of the impact of each task on the enterprise or corresponding component(s) thereof. The example process of FIG. 7 may group the tasks based on one or more components within the enterprise (block 706). For example, tasks associated with each process site in the enterprise may be grouped together. In other examples, the tasks may be grouped according to their corresponding system, area, unit, process cell, or any other suitable component or division of the enterprise. The example process calculates a weighted average of the criticality and actionability for each group of tasks (block 708). In some examples, the criticality and actionability of each task may be weighted equally. In other examples, different types of tasks and/or tasks having different priorities may be assigned different weights. The weighting of the tasks may be based on industry standards, best practices, statistical analyses of the historical operations of process systems, etc. Furthermore, the example process of FIG. 7 may update the weighted averages for each group of tasks based on user input weights for one or more of the tasks (block 710). In some examples, a user may adjust the weight of tasks based on types of tasks, categories of tasks, and/or subcategories of tasks. Further, a user may individually modify the weights of particular tasks within the enterprise to be emphasized or deemphasized as appropriate.

Based on the foregoing calculations, the example process generates a chart with markers indicating the criticality and actionability of each group of tasks (block 712). For example, the chart may have an X-axis corresponding to the criticality of the grouped tasks and a Y-axis corresponding to the actionability of the grouped tasks and the markers plotted in the chart according to the weighted average calculated at block 710. The example process also includes adjusting the appearance of each marker to indicate one or more characteristics associated with each group of tasks (block 714). For example, the chart may be a bubble chart and the markers may be bubbles within the chart where the size of each bubble indicates the number of tasks within the group associated with the bubble. In other examples, the size of each bubble may indicate the size and/or significance of the site, system, or other component of the enterprise with which the tasks were grouped. The example process then renders the chart via a display (block 716) at which point the example process ends.

FIG. 8 is a flowchart representative of an example process that may be carried out to implement the apparatus of FIG. 1 to generate graphics representing tasks grouped by category with respect to different components of an enterprise. The example process of FIG. 8 includes identifying outstanding tasks in an enterprise (block 800). In some examples, the tasks identified may be all tasks within the enterprise. In other examples, the example process may only identify a portion of the tasks within an enterprise. How each outstanding task is identified may depend upon the type task as described above in connection with the example process of FIG. 7. The example process also includes grouping the tasks based on components within the enterprise (block 802). The components of the enterprise that serve as the basis of the task groupings may correspond to individual process sites, systems, areas, units, process cells, geographic regions, etc. By grouping the tasks in this manner, the number, condition, status, and/or characteristics of tasks associated with each of the different components identified may be compared to provide a user an overall view of the enterprise and where action may need to be taken to improve the reliability and/or safety of the entire enterprise.

The example process further includes grouping the tasks within one or more of the components based on task categories corresponding to the types of tasks at issue (block 804). For example, types of tasks that may serve as different categories may correspond to operating system updates, hotfixes, information articles, lifecycle changes, etc. The example process of FIG. 8 then generates graphics representing the tasks in each category associated with each of the one or more components of the enterprise (block 806). The nature of the graphics may depend upon the task category associated with each task. For example, graphics representing tasks associated with operating system updates, information articles, hotfixes, and technical support calls may include an indication of the number of tasks within each respective task category for the corresponding component of the enterprise. In other examples, tasks associated with support and warranty may be represented by graphics indicating the remaining period for support and/or warranty assets associated with each of the components in the enterprise. Other graphics may be provided to appropriately represent the other types of tasks associated with each of the components in the enterprise.

The example process of FIG. 8 further may render the graphics via a display (block 808). In some examples, the graphics associated with the tasks in a particular category of each of the one or more components of the enterprise may be rendered together and/or aligned to enable a user to compare the tasks across the different components of the enterprise. Additionally or alternatively, the graphics associated with the tasks for each task category of a particular component of the enterprise may be aligned and/or positioned relative to one another to enable a user to quickly identify the tasks in any of the task categories associated with the same component of the enterprise. Once the graphics are rendered, the example process of FIG. 8 ends.

FIG. 9 is a flowchart representative of an example process that may be carried out to implement the apparatus of FIG. 1 to generate a summary of the tasks associated with a particular component of the enterprise that provides detailed information associated with the corresponding tasks. The example process of FIG. 9 includes identifying outstanding tasks in an enterprise (block 900). In some examples, the tasks identified may be all tasks within the enterprise. In other examples, the example process may only identify a portion of the tasks within an enterprise. How each outstanding task is identified may depend upon the type task as described above in connection with the example process of FIG. 7. The example process also includes grouping the tasks based on components within the enterprise (block 902). The components of the enterprise that serve as the basis of the task groupings may correspond to any appropriate division of the enterprise at any appropriate granularity as described in connection with the example process of FIG. 8.

The example process further includes grouping the tasks associated with a particular component of the enterprise based on task categories corresponding to the types of tasks at issue (block 904). For example, types of tasks that may serve as different categories may correspond to operating system updates, hotfixes, information articles, lifecycle changes, etc. The example process may also group the tasks of each category into subcategories based on a priority of the respective tasks (block 906). For example, hotfixes may be separated into anyone of the following subcategories: mandatory, as needed, next service interval, information only. In such examples, the mandatory subcategory has the highest priority while the information only subcategory of hotfixes may have the lowest priority.

The example process of FIG. 9 then generates a visual summary of the tasks in each category in the particular component of the enterprise that includes a table that provides detailed information regarding the corresponding tasks of each category (block 908). For example, a table generated for the tasks in the operating system updates category may include information such as a description of updates to be downloaded and/or the nodes and/or workstations where the updates apply. In addition to passive information, the table may provide a user the ability to download or dismiss any or all of the outstanding updates for any or all of the corresponding nodes and/or workstations. The example process may also adjust the appearance of the tasks in one or more of the subcategories having a high priority (block 910). For example, the tasks associated with mandatory hotfixes may be highlighted, bolded, outlined, colored, etc. differently than the lower priority hotfixes to draw the attention of a user to the tasks most likely to require the attention of the user.

The example process of FIG. 9 further may render the visual summary with at least one table associated with one of the categories via a display (block 912). In some examples, the tables may be hidden from view by a user until the user enters a command for a particular table to be rendered that corresponds to the category of tasks the user desires to look at in detail. Once the table is rendered, the example process of FIG. 9 ends.

Figure 10:
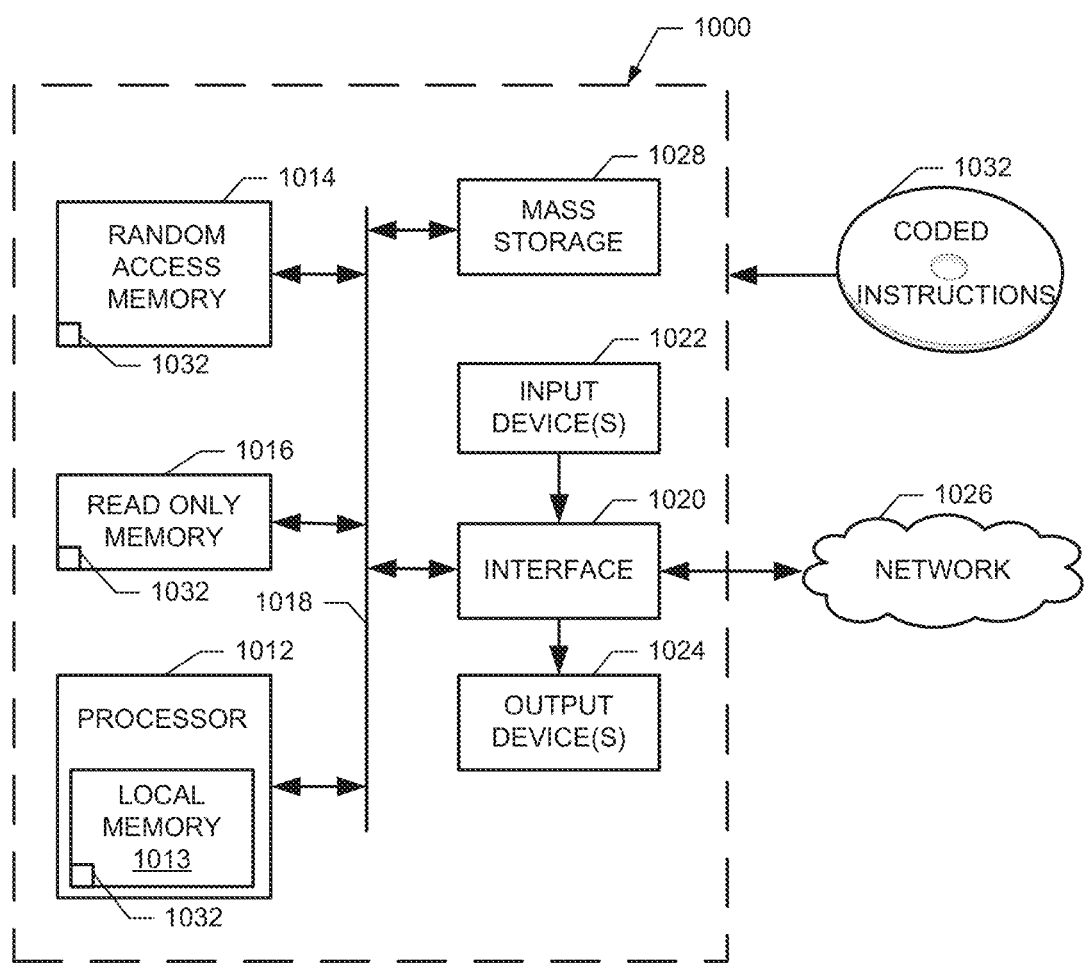
FIG. 10 is a schematic illustration of an example processor platform 1000 that may be used and/or programmed to carry out the example processes of FIGS. 7-9 and/or, more generally, to implement the system management application 106, and/or the example apparatus 100 of FIG. 1.

FIG. 10 is a schematic illustration of an example processor platform 1000 that may be used and/or programmed to carry out the example processes of FIGS. 7-9 to implement the example apparatus 100 FIG. 1. The platform 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface. One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system. One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives.

Coded instructions 1032 to implement the example processes of FIG. 7-9 may be stored in the local memory 1013, the mass storage device 1028, in the volatile memory 1014, in the non-volatile memory 1016, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
    analyzing, using a processor, tasks to be performed in an enterprise to determine a criticality of the tasks and an actionability of the tasks, the tasks associated with at least one of maintenance of operations or administrative actions in a process control system of the enterprise, the criticality of respective ones of the tasks based on (1) a severity of a risk associated with at least one of a safety or a reliability of the operations of a component in the process control system if the task is not performed and (2) a significance of a difference in likelihood of the risk being realized if the task is performed relative to the likelihood of the risk being realized if the task is not performed, the actionability of respective ones of the tasks indicative of at least one of a viability or a feasibility of performing the task relative to performing other tasks, wherein the component corresponds to at least one of one or more sites, one or more systems, one or more units, one or more areas, one or more process cells, one or more workstations, one or more software packages, one or more pieces of hardware, or one or more field devices in the process control system;
    ordering, using the processor, the tasks based on the criticality and the actionability of the tasks;
    rendering a user interface having multiple views via a display, the user interface providing a first graphic representative of at least a portion of the ordered tasks, wherein the first graphic is a chart having a first axis corresponding to the criticality of the tasks and a second axis corresponding to the actionability of the tasks, the chart to include markers plotted thereon, ones of the markers representative of one or more of the tasks;
    displaying the chart in a site view of the user interface when the site view for the chart is user-selected via the user interface, wherein the markers are a first set of markers corresponding to different sites within the enterprise when the site view is user-selected; and
    displaying the chart in a system view of the user interface when the system view for the chart is user-selected via the user interface, wherein the markers are a second set of markers corresponding to different systems within the enterprise when the site view is user-selected, wherein locations of the first set of markers plotted within the chart are different than locations of the second set of markers plotted within the chart.

2. The method of claim 1, wherein a location of each marker plotted on the chart is based on a weighted average of the criticality and the actionability of the one or more tasks associated with each corresponding marker.

3. The method of claim 1, wherein each marker corresponds to any of one or more sites, one or more systems, one or more areas, one or more units, one or more process cells, or one or more workstations within the enterprise.

4. The method of claim 3, further comprising adjusting any one of a size, a shape, an outline, a color, or an intensity of each marker to indicate a corresponding size of the one or more sites, one or more systems, one or more areas, one or more units, one or more process cells, or one or more workstations associated with the marker.

5. The method of claim 3, further comprising adjusting any one of a size, a shape, an outline, a color, or an intensity of each marker to indicate a number of tasks associated with the corresponding one or more sites, one or more systems, one or more areas, one or more units, one or more process cells, or one or more workstations.

6. The method of claim 1, wherein analyzing the tasks is based on vendor specific information associated with any of software, firmware, or hardware associated with the corresponding tasks.

7. The method of claim 1, further comprising:
    grouping the tasks into one or more categories; and
    rendering, via the display, a second graphic indicative of a number, a status, or a characteristic of the tasks associated with each of the one or more categories.

8. The method of claim 7, further comprising:
    grouping the tasks in each of the one or more categories into first and second subcategories, the tasks associated with the first subcategory having a higher priority than the tasks associated with the second subcategory; and
    rendering, via the display, a third graphic having information relating to the tasks associated with at least one of the first subcategory or the second subcategory within one of the one or more categories.

9. The method of claim 8, further comprising:
    reordering the tasks based on user input weights; and
    updating any of the first, second, or third graphics based on the reordered tasks.

10. The method of claim 9, wherein the user input weights are to be applied to any of one or more of the tasks, one or more of the first or second subcategories, one or more of the categories, one or more sites, one or more systems, one or more areas, one or more units, one or more process cells, or one or more workstations.

11. The method of claim 7, wherein the one or more categories correspond to at least one of a lifecycle status or a change in lifecycle status.

12. The method of claim 7, wherein the one or more categories correspond to at least one of license utilization or a registration status.

13. The method of claim 7, wherein the one or more categories correspond to at least one of customer support expirations or warranty expirations.

14. The method of claim 7, wherein the one or more categories correspond to any of information articles, hotfixes, operating system updates, or technical support calls.

15. The method of claim 1, wherein a first one of the markers is associated with a subset of the tasks, a location of the first one of the markers plotted on the chart is based on a first task within the subset having at least one of a highest criticality or a highest actionability relative to other tasks in the subset.

16. A system, comprising:
a processor to implement a system management application to:
analyze tasks to be performed in an enterprise, the tasks associated with at least one of maintenance of operations or administrative actions in a process control system of the enterprise;
quantify a criticality for the tasks, the criticality of respective ones of the tasks based on (1) a severity of a risk associated with at least one of a safety or a reliability of the operations of a component in the process control system if the corresponding task is not performed and (2) a significance of a difference in likelihood of the risk being realized if the task is performed relative to the likelihood of the risk being realized if the task is not performed, wherein the component corresponds to at least one of one or more sites, one or more systems, one or more units, one or more areas, one or more process cells, one or more workstations, one or more software packages, one or more pieces of hardware, or one or more field devices in the process control system; and
quantify an actionability for the tasks, the actionability of respective ones of the tasks indicative of at least one of a viability or a feasibility of performing the task relative to performing other tasks; and
a display to render user interface having multiple views, the user interface to provide a first graphic representative of at least one of the criticality or actionability corresponding to at least a portion of the tasks in the enterprise, wherein the first graphic is a chart having a first axis corresponding to the criticality of the tasks and a second axis corresponding to the actionability of the tasks, the chart to include markers plotted thereon, ones of the markers representative of one or more of the tasks, the user interface to:
provide the chart in a site view when the site view for the chart is user-selected via the user interface, wherein the markers are a first set of markers corresponding to different sites within the enterprise when the site view is user-selected; and
provide the chart in a system view when the system view for the chart is user-selected via the user interface, wherein the markers are a second set of markers corresponding to different systems within the enterprise when the site view is user-selected, wherein locations of the first set of markers plotted within the chart are different than locations of the second set of markers plotted within the chart.

17. The system of claim 16, wherein different ones of the markers correspond to different components of the enterprise.

18. The system of claim 17, wherein an appearance of the different ones of the markers is to be indicative of a size of the different components of the enterprise or a number of tasks associated with the different components of the enterprise.

19. The system of claim 16, wherein a location of each marker plotted on the chart is based on a weighted average of the criticality and the actionability of the one or more tasks associated with each corresponding marker.

20. The system of claim 19, wherein weights associated with the criticality or actionability of respective ones of the tasks or a group of tasks are to be adjusted based on a user input.

21. A tangible non-transitory computer readable medium comprising instructions that, when executed, cause a machine to at least:
analyze tasks in an enterprise to determine a criticality of the tasks and an actionability of the tasks, the tasks associated with at least one of maintenance of operations or administrative actions in a process control system of the enterprise, the criticality of respective ones of the tasks based on (1) a severity of risk associated with at least one of a safety or a reliability of the operations of a component in the process control system if the corresponding task is not performed and (2) a significance of a difference in likelihood of the risk being realized if the task is performed relative to the likelihood of the risk being realized if the task is not performed, the actionability of respective ones of the tasks indicative of at least one of a viability or a feasibility of performing the task relative to performing other tasks, wherein the component corresponds to at least one of one or more sites, one or more systems, one or more units, one or more areas, one or more process cells, one or more workstations, one or more software packages, one or more pieces of hardware, or one or more field devices in the process control system;
order the tasks based on the criticality and the actionability of the tasks;
render a user interface having multiple views via a display, the user interface providing a first graphic representative of at least a portion of the ordered tasks, wherein the first graphic is a chart having a first axis corresponding to the criticality of the tasks and a second axis corresponding to the actionability of the tasks, the chart to include markers plotted thereon, ones of the markers representative of one or more of the tasks;
display the chart in a site view of the user interface when the site view for the chart is user-selected via the user interface, wherein the markers are a first set of markers corresponding to different sites within the enterprise when the site view is user-selected; and
display the chart in a system view of the user interface when the system view for the chart is user-selected via the user interface, wherein the markers are a second set of markers corresponding to different systems within the enterprise when the site view is user-selected, wherein locations of the first set of markers plotted within the chart are different than locations of the second set of markers plotted within the chart.

22. The tangible non-transitory computer readable medium of claim 21, wherein a location of each marker plotted on the chart is based on a weighted average of the criticality and the actionability of the one or more tasks associated with each corresponding marker.

23. The tangible non-transitory computer readable medium of claim 21, wherein the instructions, when executed, further cause the machine to:
group the tasks into one or more categories; and render, via the display, a second graphic indicative of a number, a status, or a characteristic of the tasks associated with each of the one or more categories.

24. The tangible non-transitory computer readable medium of claim 23, wherein the instructions, when executed, further cause the machine to:
group the tasks in each of the one or more categories into first and second subcategories, the tasks associated with the first subcategory having a higher priority than the tasks associated with the second subcategory; and
render, via the display, a third graphic having information relating to the tasks associated with at least one of the first subcategory or the second subcategory within one of the one or more categories.

* * * * *